B. P. BOWER.
SEWER, STENCH AND GAS TRAPS.
No. 194,070. Patented Aug. 14, 1877.
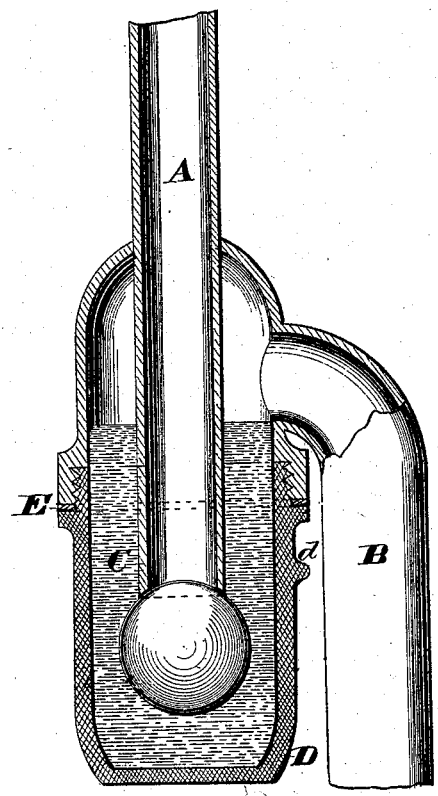

UNITED STATES PATENT OFFICE.

BUCKLAND P. BOWER, OF CLEVELAND, OHIO.

IMPROVEMENT IN SEWER, STENCH, AND GAS TRAPS.

Specification forming part of Letters Patent No. 194,070, dated August 14, 1877; application filed June 6, 1877.

*To all whom it may concern:*

Be it known that I, BUCKLAND P. BOWER, of Cleveland, in the county of Cuyahoga and State of Ohio, have invented certain new and useful Improvements in Sewer, Stench, and Gas Traps; and I do hereby declare the following to be a full, clear, and exact description of the invention, such as will enable others skilled in the art to which it pertains to make and use it, reference being had to the accompanying drawings, which form part of this specification.

My invention relates to an improvement in sewer, stench, and gas traps; and consists in making the depending or water-holding portion of the trap removable, and also in forming the said removable portion of glass or of metal.

In the drawing, the figure is a longitudinal central section of a sewer, gas, or stench trap which represents my invention.

It should be understood, however, that this form of trap is not essential, the particular form of trap forming no essential part of this invention, it being equally applicable to all traps wherein there is a depending portion or basin that retains the water or catches the sediment.

A, in the instance shown, is the inlet-pipe; B, the outlet-pipe; C, the basin or depending portion that holds the water, or wherein sediment and dirt may collect. D is a basin or cup-shaped removable section.

This removable section may be formed of metal, or it may be formed of glass, or any other suitable material, and it may be attached either by screwing one section to the other, or the two sections may be fastened together by bolts, screws, or in any other suitable manner, the particular manner of fastening them not being an essential part of this invention.

The advantages of this construction will be apparent upon examination, the following being some of the advantages: Suppose that sediment or dirt should collect in the chamber C so as to impede or stop the action of the trap, or to block up the passage-way, this matter would naturally collect in the basin or cup D. This cup may then be readily removed and the offal carried in the cup to any suitable place of deposit, whereas, in the old style of trap, with simply a screw-stopper at the bottom, this offal would have to drop away into another receptacle, or upon the floor of the apartment.

Another advantage is, that the basin or cup will usually be that portion of the trap which is most liable to burst in freezing. This removable portion, under such circumstances, could be readily taken off and renewed by any person without the employment of a plumber, and at little expense.

When the trap is of the nature substantially as shown in the drawing, wherein there is valve mechanism of any description, such as a ball, or a float, &c., the cup D may be made of glass, so that a person may, by looking through the glass, see whether the valve is in proper working order, and may also see whether there is necessity for cleaning the trap. It also furnishes a ready means, when the drain-pipe is stopped up, to ascertain whether the difficulty is in the trap itself or within the pipe, by simply looking through the glass.

The removable section D may or may not be provided with a lug, d, for facilitating the attachment or removal of the section; or, instead of the lug, it may be provided with a wrench-seat for the same purpose, or it may be plain.

E is a gasket, of rubber or other suitable packing, which may be employed, if necessary.

The section D may be rounded at its bottom, as shown in the drawings, or it may be made flat at its bottom in the nature of a tumbler, so that when removed it will stand upon its own bottom until its contents may be emptied.

This device is equally applicable for water-pipes, sewer or drain pipes, &c., wherever traps are employed to catch sediment or foreign matters within the pipe.

When I form the section D of glass, I do not limit myself to make the section removable, as a trap of that nature would possess advantages of exposing the interior to view, whether that section be or be not made removable; but I prefer to make it removable.

It is apparent that the glass section cannot be forced to a perfect bearing with the metallic section of the trap; therefore I prefer, generally, to interpose a gasket of rubber or other equivalent material between the metal and the glass, for the purpose of receiving the strains that would otherwise come upon the glass, and to insure a tight joint for any great strain upon the glass.

What I claim is—

1. In a trap, a removable glass section formed at the bottom so as to stand erect without support when removed from the trap, substantially as described.

2. In a trap, a glass section screw-cut at the top for attachment to the adjacent portion of the trap, substantially as described.

3. In a trap provided with a glass section, D, the combination, with said trap and glass section, of the interposed gasket of rubber or equivalent material, substantially as described.

4. In a sewer-trap, a sediment-chamber formed of glass, substantially as described.

5. In combination with a trap embracing valve-mechanism, a removable section, D, of glass, located with respect to the said valve mechanism so as to expose the same to view, substantially as and for the purposes described.

In testimony whereof I have signed my name to this specification in the presence of two subscribing witnesses.

BUCKLAND P. BOWER.

Witnesses:
FRANCIS TOUMEY,
W. E. DONNELLY.